United States Patent Office 3,175,135
Patented Mar. 23, 1965

3,175,135
HIGH VOLTAGE VARIABLE CONDENSER
Cornelis N. Coenraads, Reading, Mass., assignor to Ion Physics Corporation, Burlington, Mass., a corporation of Delaware
Filed Nov. 6, 1962, Ser. No. 235,758
1 Claim. (Cl. 317—249)

This invention relates to variable condensers, and more particularly to a new and improved device adapted to controllably vary the capacitance in a very high voltage electrical circuit.

High voltages in the order of 500 kv. to 2 mev. and higher generally render conventional capacitance variation means inoperable, or unsatisfactorily inefficient. Because of the extreme electrical forces acting on the various components, mechanical manipulation of a moveable plate condenser becomes impracticable at very high voltages. Furthermore, since dielectric breakdown characteristics and insulating capabilities of dielectric materials are not necessarily compatible parameters, the maintaining of both adequate insulation and dielectric breakdown strength between the moving elements of such a device becomes an acute problem. Although satisfactory insulation can be obtained through the use of a fluid medium such as pressurized $SF_6$ (sulfur hexafluoride) gas or oil, establishing and maintaining moving parts in such an environment is extremely difficult. Also the dielectric constant of such insulating gas is generally low. A possible arrangement whereby a degree of circuit capacitance variation can be achieved is that of a plurality of fixed low voltage condensers in combination with means for remotely switching successive condensers out of, or into, the circuit. This, however, is at best an awkward approach and provides only stepwise capacitance variation.

Accordingly, it is a principal object of this invention to provide a new and improved high voltage variable condenser.

It is another object of this invention to provide a high voltage variable condenser that features continuous stepless variation over its entire capacitance range.

It is still another object of this invention to provide a variable condenser of the type described having a discrete geometry and component arrangement adapted to obviate the adverse electrical stresses inherent in very high voltage circuits.

Another object of this invention is to provide a high voltage variable condenser having no moving mechanical components wherein pressurized fluid insulation can be practicably maintained.

Another object of this invention is to provide a variable condenser adapted for use at potentials in excess of 500 kv. wherein capacitance variation is achieved by controlling the amount of an electrically conductive liquid that is proximate to a fixed capacitance member.

These, together with other objects and features of this invention will become more readily apparent from the following detailed description thereof taken in conjunction with the accompanying drawings wherein.

In accordance with the above enumerated objects, the subject invention comprises a variable condenser which has a symmetrical structure and employs the novel concept of utilizing an electrically conductive liquid as the moveable charged surface thereof. Basically, a preferred embodiment of the invention includes a conductive rod which is normally at high potential and has a dielectric coating thereon, a grounded cylindrical metallic housing within which said rod is coaxially disposed, and means for filling said housing with conducting fluid. In operation, the conducting liquid, as it fills the annular space between housing and conductive rod becomes one charged surface of the condenser. The conductive rod, of course, constitutes the other charged surface with the dielectric coating serving as both insulator and dielectric. As the conducting liquid rises in the housing, the capacitance increases, as in conventional concentric cylindrical condensers, by $$\frac{K}{2 \log_e R_2/R_1 \, (9 \times 10^3)}$$

micro-farads/meter. In the above expression K is the dielectric constant of the dielectric, $R_1$ is the radius of the conductive rod, and $R_2$ is the radius of the outer surface of the dielectric (or inner surface of the conducting liquid). Additionally, various other features and innovations hereinafter described in detail cooperate to effect an operable device whereby the several objects of this invention are accomplished.

Figure 1:
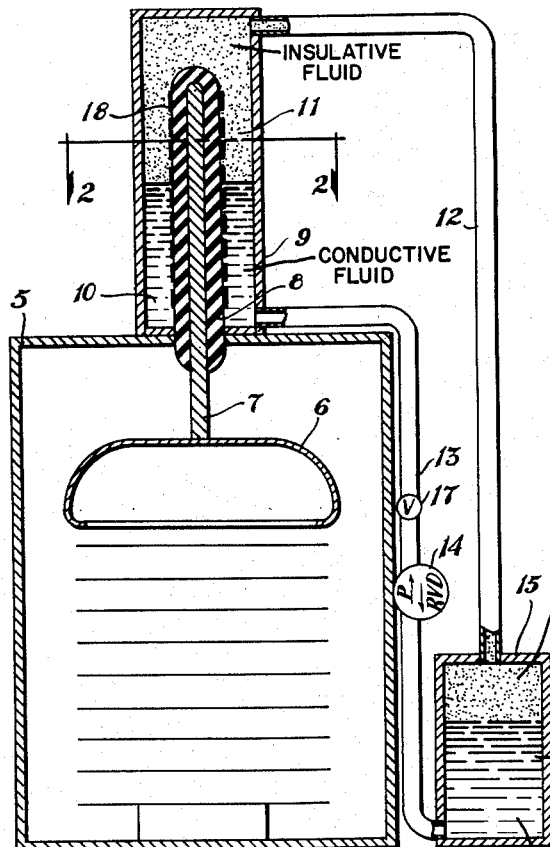
FIGURE 1 illustrates one presently preferred embodiment of the invention in combination with a high voltage generating device.
Figure 2:
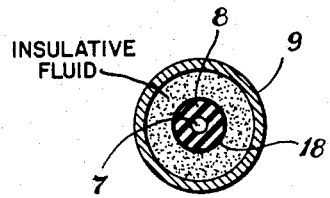
FIGURE 2 is a sectional view of said presently preferred embodiment taken at 2—2 of FIGURE 1.

Referring now to FIGURE 1, there is illustrated one embodiment of the invention in combination with a high voltage source. In such an arrangement the invention finds utility as a means for changing the energy storage capacity of the high voltage source. Further, direct advantage may be taken of such a device to facilitate beam pulsing in a particle accelerator, to vary the time constants in a high voltage circuit, to perform high voltage breakdown phenomenon studies, and to perform various high voltage materials tests. The high voltage source 5 of FIGURE 1 may be a Van de Graaff generator such as the apparatus disclosed in United States Patent No. 2,252,668 issued to John G. Trump, or similar device having a high voltage terminal 6 upon which a voltage in the order of 500 kv. or higher is developed. The variable condenser of the present invention is housed in a cylindrical metal casing 9 which is maintained at ground potential and may be mounted directly on the high voltage source frame. Although remote location of the condenser is equally feasible, the illustrated arrangement simplifies the insulation problem and is therefore preferred. Electrically conductive rod 7 serves as both a conduit to bring the high voltage potential to the variable condenser and as the fixed charge collecting member thereof. A coating 8 of dielectric material is fabricated on rod 7 as shown. Ideally, the dielectric material is chosen to have a high dielectric constant, high dielectric strength, and good insulating capabilities. It is also necessary that the dielectric material be unaffected by the conducting liquid and insulating fluid to which it is exposed. The thickness of coating 8 is determined by the insulation requirements of the particular potential involved, and it is noted that in the present embodiment coating 8, in addition to its function as condenser dielectric, serves as an insulating bushing whereby the high voltage is brought into the condenser. While the exact composition and dimensions of the dielectric coating 8 must be determined from the particular parameters in any given instance, it has been found that certain thermosetting urethanes provide dielectric materials that are uniquely adapted to the present invention. Such a urethane dielectric material can be obtained by curing a mixture of an isocyanate terminated polyalkylene ether based polyurethane polymer and tolylene 2, 4, diisocyanate with 2, 4, 6 tri (dimethylamino-methyl) phenol. Materials thus fabricated have dielectric constants in the order of 3 to 5, exhibit dielectric strength of about one million volts/inch, and support voltages in excess of 500 kv. per inch. While such materials are particularly suited to the present device, they are suggested by way of example only, the invention in its broader sense comprehending any suitable dielectric material. The moveable charge collecting member of the subject variable condenser comprises the annular column of conducting liquid 10 which is pumped into and out of space 11 by reversible variable delivery pump 14 through conduit 13 and valve 17. A reservoir of conducting liquid 10 is maintained in tank 15, and conduit 12 provides for a closed system wherein an insulating fluid may be maintained. Conducting liquid 10 may be brine, or mercury or the like and the insulating fluid may be pressurized $SF_6$ (sulfur hexafluoride) gas, or oil, or any insulating medium that does not mix with the particular conducting liquid used. Although the insulating fluid is desirable in most cases, it is not absolutely necessary. At very high voltages, the surface breakdown characteristics of an insulator are a greater problem than the volume breakdown characteristics. That is, while insulation one inch thick would support one million volts between rod 7 and conducting liquid 10, the voltage gradient between the top of rod 7 and the top surface of the conducting liquid might be such that surface breakdown would occur at lower voltages. To alleviate this problem a plurality of metal grading rings 18 are disposed at equal intervals on the surface of the dielectric. This provides for a uniform voltage gradient between the top of rod 7 and the surface of the conducting liquid resulting in optimum surface voltage breakdown capability. The geometric configuration of the subject condenser is preferably cylindrical as indicated by FIGURE 2. Even though the novel concepts of this invention apply equally to rectangular plate condensers (i.e. rod 7 could be replaced by a fixed plate) the symmetrical configuration tends to cancel out many of the severe mechanical stresses caused by the attractive and repulsive forces of the very high potentials involved and is therefore preferred. The diameter of casing member 9 is made as large as possible as is the ratio of the radius of rod 7 to the radius of the outer surface of the dielectric. An examination of the expression for micro-farads per meter of concentric cylinders $$\left( \frac{K}{2 \log_e R_2/R_1 \, (9 \times 10^3)} \right)$$

reveals why this is so.

Since the ratio of the radius of rod 7 to the radius of the outer surface of the dielectric, or $R_2/R_1$ approaches unity the greater will be the capacitance per centimeter and concomitant range of the condenser. It is to be noted that the total capacitance of the condenser is the sum of the capacitance between rod 7 and conducting liquid 10 and the capacitance between rod 7 and concentric metallic casing 9. Increased operating range of the condenser is therefore obtained by keeping the capacitance between rod 7 and housing 9 at a minimum. This can be accomplished by making the diameter of the housing large compared to the diameter of rod 7, or by selecting an insulating fluid that has an extremely low dielectric constant, or both. A non-metallic casing 9 would of course essentially eliminate this unwanted capacitance. Such an arrangement is undesirable, however, since the metallic casing acts as a Faraday cage and terminates the electric field of the device. It is apparent from the foregoing that various parameters involved are to an extent incompatible and that some compromise must be made to effect an operable, practical device. By way of example, a condenser of the type described having a urethane coated rod seven feet in length and a metallic casing three feet in diameter could be expected to provide capacitance variation in an approximate range of 100 $\mu\mu$farads to 1000 $\mu\mu$farads for a one mev. system. Such a device would be required to pump about seven cubic feet of brine or other conducting liquid into the casing to achieve maximum capacitance. Finally, the condenser as described above can be calibrated to a very high degree of accuracy and a liquid level gauge (not shown) may be employed on either the tank 15 or casing 9 to indicate the condenser capacitance.

Figure 3:
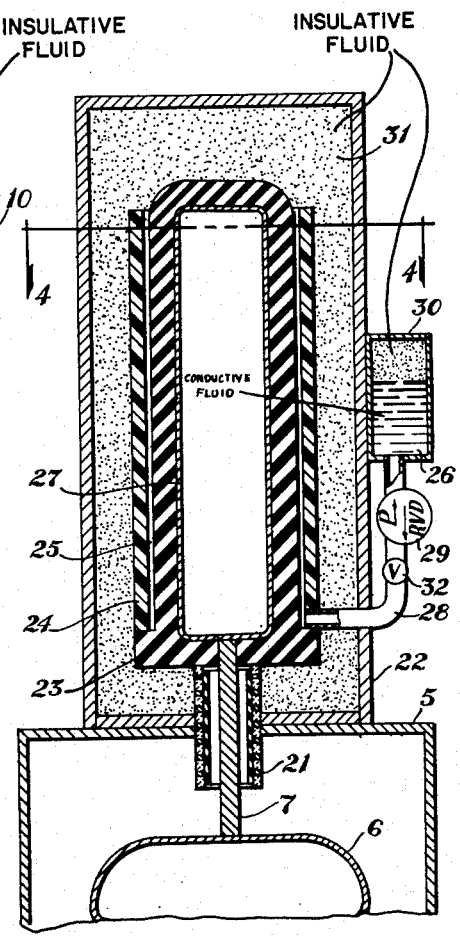
FIGURE 3 illustrates an alternate embodiment of the invention.
Figure 4:
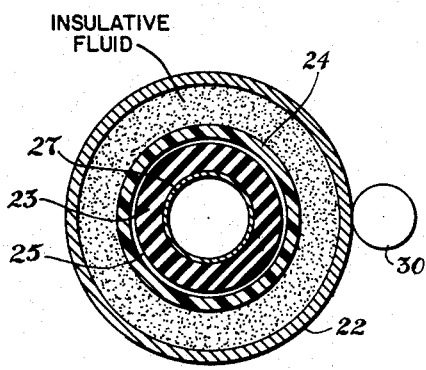
FIGURE 4 is a sectional view thereof taken at 4—4 of FIGURE 3.

An alternate embodiment of this invention whereby optimization of various parameters is achieved is illustrated by FIGURES 3 and 4. In this arrangement conductive rod 7 brings the high potential into the condenser through high voltage bushing 21. The fixed charge collecting member, instead of being an extension of rod 7 is, in the present case, metallic tubular member 27. The dielectric coating 23 is flanged at the bottom to permit a sleeve member 24 to be fixedly attached thereto in concentric relationship with tubular member 27 so as to cooperate with said coating 23 to establish annular space 25 therebetween. Sleeve member 24 is nonmetallic and, ideally, has a low dielectric constant. Annular space 25 is very thin, preferably one-tenth of an inch or less. A reservoir of mercury 26 is maintained in container 30, and a reversible variable delivery pump 29 is provided to pump said mercury into and out of annular space 25 through valve 32 and conduit 28. The condenser thus described resides in metallic casing 22, the interior 31 of which is maintained under pressurized $SF_6$ (sulfur hexafluoride) gas. It will be appreciated that the following advantages are inherent in such an arrangement: (a) a greatly reduced required quantity of conducting fluid; (b) less space and lower capacity pumping means; (c) rapid response due to the nature of the conducting fluid and the limited volume to be filled; (d) a larger $R_2/R_1$ ratio due to the increased diameter of fixed charge collecting member 27 resulting in increased range of operation; and, (e) the ability to make casing 22 as large as practicable without increasing the quantity of conducting fluid required thereby further decreasing the effects of capacitance between tubular member 27 and said casing 22.

The above-described arrangements are illustrative of the principles of this invention only. Since numerous other arrangements may be devised by those skilled in the art without departing from the scope of the invention, it is intended that the extent thereof be defined in, and limited by, the appended claims only.

Having thus described the invention, what is claimed as new and desired to be secured by Letters Patent is:

A variable capacitor comprising a fixed charge collecting member having a dielectric coating thereon, means for effecting a uniform voltage gradient along the surface of said dielectric coating, a grounded metallic container for said fixed charge collecting member, said fixed charge collecting member having a smaller diameter than said container and being therein disposed in spaced relationship from the walls thereof, a pressurized insulating fluid within said container, a reservoir of electrically conductive liquid, conduit means connecting said reservoir and said container, means including a pump and said conduit means for pumping said electrically conductive liquid into and out of said container, said means for pumping, said conduit means, said reservoir, and said container comprising a closed system adapted to maintain said insulating fluid at a substantially constant pressure for all levels of said electrically conductive liquid, and means for electrically connecting said fixed charge collecting member to a high voltage terminal.

References Cited in the file of this patent
UNITED STATES PATENTS

| | | |
|---|---|---|
| 1,108,793 | Martin | Aug. 25, 1914 |
| 2,881,372 | Dubilier et al. | Apr. 7, 1959 |